Figure 3:
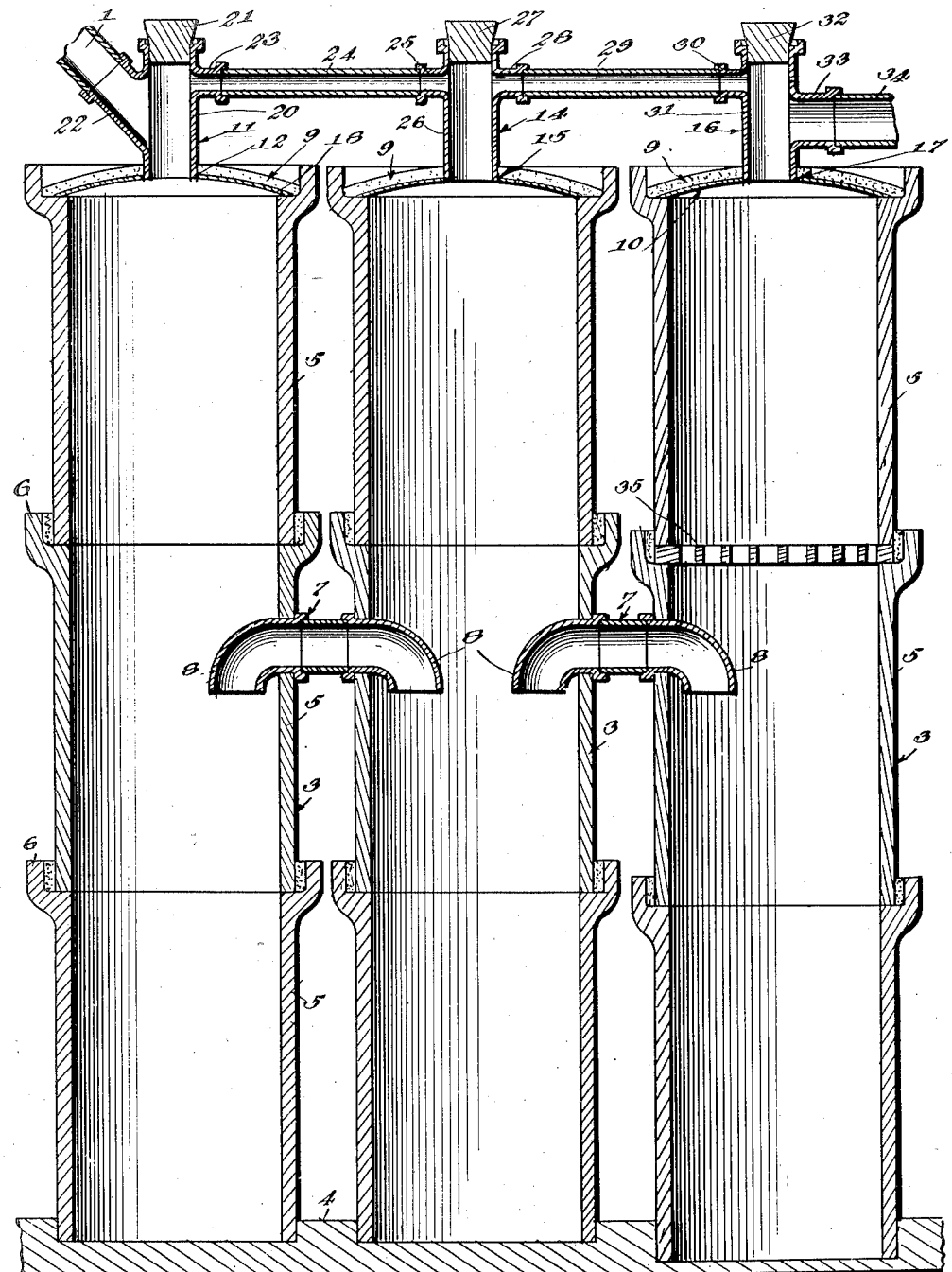

April 9, 1929.  R. M. BIRNBACH  1,708,864
SEWAGE DISPOSAL SYSTEM
Filed June 8, 1925  2 Sheets-Sheet 1
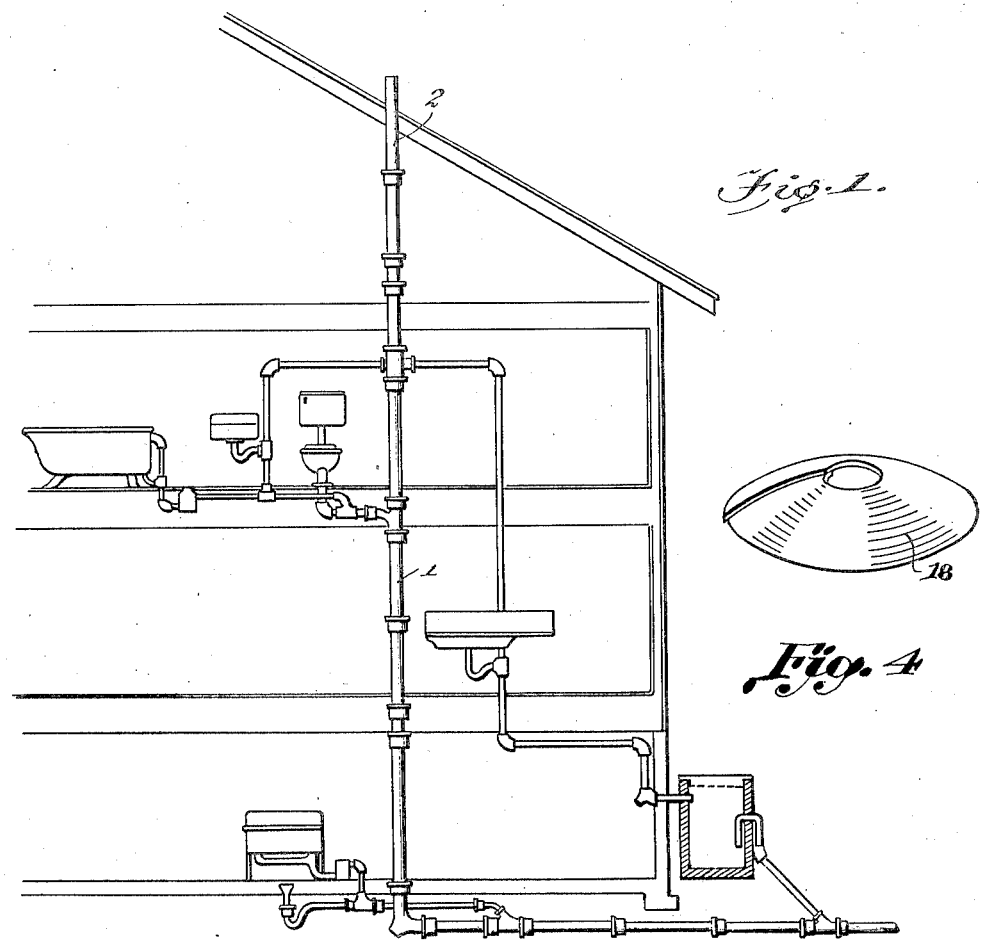
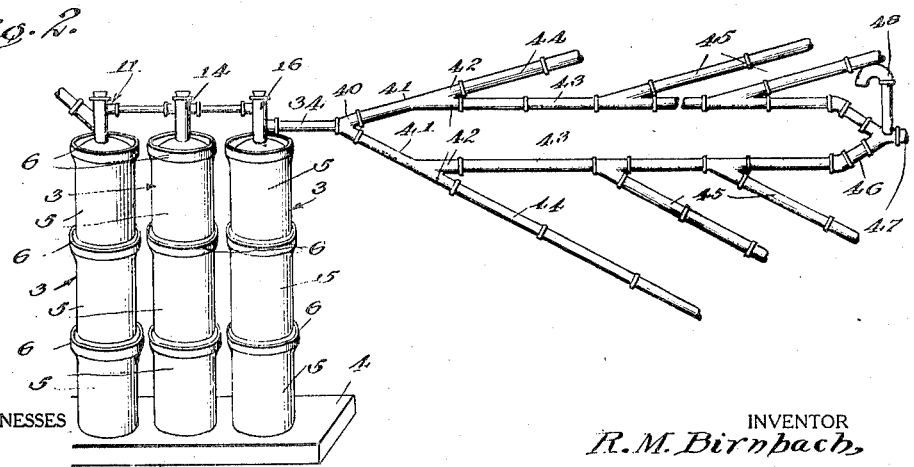

April 9, 1929.  R. M. BIRNBACH  1,708,864
SEWAGE DISPOSAL SYSTEM
Filed June 8, 1925   2 Sheets-Sheet 2

WITNESSES  INVENTOR
R. M. Birnbach,
BY
ATTORNEYS

Patented Apr. 9, 1929.

1,708,864

UNITED STATES PATENT OFFICE.

RAY MARION BIRNBACH, OF LITTLE ROCK, ARKANSAS.

SEWAGE-DISPOSAL SYSTEM.

Application filed June 8, 1925. Serial No. 35,759.

This invention relates to sewage disposal systems.

The kind of decomposition which sewage undergoes is determined by the kind of microbes which can freely develop and remain active in the sewage and the kind of microbes which can develop and remain active in the sewage is in turn determined by the access or exclusion of air or light. In the absence of oxygen the sewage undergoes changes of a putrescent nature owing to the growth of the putrefactive or anaerobic organizations which render the sewage offensive. If following the stage of decomposition promoted by the development and activity of the anaerobic organisms, the sewage is subjected to an excess of free oxygen, aerobic organisms develop which complete the decomposition of the sewage and render it harmless and inoffensive.

One of the principal objects of the present invention resides in the provision of a scientifically correct, yet simple, practical and economical system of this character, that may be successfully constructed from material readily available in any community and which is designed to automatically receive and automatically promote the spontaneous reduction, oxidation, putrefaction and sanitary disposal of the sewage through the agencies of the anaerobic and aerobic bacteria always contained in the sewage and ready to develop under proper conditions.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a view partly in section and partly in elevation showing how a house may be piped in order to be associated with a sewage disposal system embodying the present invention, Figure 2 is a diagrammatic perspective view showing the anaerobic and aerobic laboratories embodied in the present invention, Figure 3 is a view in section of the anaerobic laboratory embodied in the present invention, and Figure 4 is a perspective view of the supporting plate for the cell top closures.

Referring to the drawings the numeral 1 designates the soil feed pipe line to which the various fittings in the house are connected and which leads to the anaerobic laboratory. The feed pipe 1 is provided with a vent pipe 2 which leads up through the roof of the house. The soil feed pipe line 1 connects with the anaerobic laboratory by means of an inlet fitting 11 hereinafter more fully described.

The anaerobic laboratory comprises a series of cells or containers, designated generally at 3, mounted on a suitable base 4. Each cell 3 is made up of upright and interfitting sections 5 of vitrous clay sewer pipe stock, each section having a bell end 6 receiving the straight end of the next upper section. The lower end of the lower section of each cell or container is cemented to or sunk into the base 4 before the plastic material of which the base is constructed has fully set or hardened. The juncture of the sections may also be cemented or packed as found desirable.

The cells are connected in series at a point half way between their tops and bottoms by means of pipes, designated generally at 7. The pipes 7 establish communication between the cells and the downwardly turned elbows 8 embodied in said pipes serve as retarders. It is to be understood that the pipes 7 may consist of straight pipes alone and that the elbows 8 may be omitted if their use is not desired or necessary.

The upper end of each container or cell 3 is closed by means of a closure, designated generally at 9, which has its inner face 10 beveled toward its center and in order to have the inner face 10 converge or bevel toward the center of the closure, the closure may be of frusto-conical form. An inlet fitting 11 has its lower end connected with and secured to the central opening 12 provided in the closure 9 of the first cell or container. A vent fitting, designated generally at 14, has its lower end fitted and secured in the opening 15 provided in the closure 9 of the second cell and an outlet fitting, designated generally at 16, has its lower end fitted and secured in the opening 17 of the closure member 9 of the cell or container.

Each closure 9 is preferably constructed of concrete which is poured in place upon a thin sheet metal support 18 which has previously been fitted within the rim of the bell end of the upper section. The sheet metal support 18 consists of an annular plate of metal which is split radially at one point in its body. The edges adjacent the split are overlapped, the metal support being sufficiently resilient to permit the flexion necessary to overlap the edges. The overlapping of the edges causes the sheet metal support to assume a frusto-conical form and in which it is held by virtue of its engagement with the inner periphery of the rim or bell end of the cell with which it is associated. The central openings of the metal supports 18 are designed to receive the fittings 11, 14 and 16 and when the concrete is poured on the metal supports the fittings are united to the closure members as the concrete hardens.

The inlet fitting 11 comprises a vertically disposed pipe section 20 having its lower end fitted in the opening 12 of the closure member 9 of the first cell and having its lower edge flush with the inner face of the closure member. The upper end of the vertical section 20 is closed by a plug 21 which is removable to enable access to the first cell 1.

A soil feed pipe line 1 connects with a branch 22 of the inlet fitting which leads into the section 20 intermediate its ends. Above the branch 22 and on the opposite side of the section 20 from the branch 22 a laterally extending vent nipple 23 is formed. The vent nipple 23 is connected to a pipe 24 which leads to a similar nipple 25 formed on the vent fitting 14. The vent fitting 14 consists of a vertical pipe section 26, the lower edge of which is flush with the inner periphery of the closure member 9 of the second cell. The upper end of the pipe section 26 is closed by a removable plug 27. In addition to the vent nipple 25 the vent fitting 14 has a vent nipple 28 which connects with a pipe 29. The pipe 29 couples with a vent nipple 30 carried on the discharge fitting 16. The discharge fitting 16 consists of a vertical pipe section 31, the lower edge of which is flush with the inner periphery of the closure member 9 of the third cell. The upper end of the pipe 16 is closed by a removable plug 32. Intermediate its ends and below the vent nipple 30 the pipe 31 is formed with a lateral outlet 33 which connects with a pipe 34 leading to the aerobic laboratory.

In the third cell 3 to which the discharge fitting 16 connects, a filter grate 35 is incorporated, the filter grate 35 in the arrangement shown being disposed between the upper section 3 and the intermediate section 5. The grate 35 is covered with any suitable filter material such as coarse gravel or the like.

The aerobic laboratory includes a Y coupling 40 which connects the pipe 34 with pipes 41 having branches 42. The branches 42 connect with main pipes 43 and branch pipes 44 and from the main pipes 43 a plurality of branches 45 extend. The main pipes 43 are connected, as indicated at 46, to a common discharge pipe 47. A vent pipe 48 leads from the connections 46 and serves to vent the aerobic laboratory.

When the sewage disposal system embodying the present invention is installed all of the cells or containers 3 are filled with water, thereby excluding all air. The water not only completely fills the cells but extends up into the fittings 11, 14, and 16 to the level of the bottom of the outlet nipple 33 of the discharge fitting 16.

In the operation of a newly installed plant, upon being put in service, a scum begins to form over the surface of the liquid within the cells, and immediately beneath the tops of said cells proper, until a thick coating of leathery like scum covers the entire underside of the tops of all the cells of the plant, and the surface of the liquid within the pipes that emerge upward from the cell tops of the plant are also at times covered with this protective scum cover. At the same time a dark sludge forms at the bottom of the cells. With a comparatively short time however a balance is finally struck, in which the thickness and depth of the scum, sludge, and liquid between, remain constant. The solid material is now being reduced, liquefied, clarified and vaporized at the same rate at which it enters the plant. This is the ideal operating condition.

The spontaneous change or reduction of solids to clarified and purified liquids and harmless vapors is due mainly to the vigorous bacterial activity and the ideal operating conditions.

In order to attain these ideal conditions it is necessary to provide, 1st, good bacterial breeding grounds, 2nd, good bacterial work shops, and 3rd certain protective features necessary to the vigor of these useful bacteria, and all incorporated in this plant.

The sludge is the incubator where the bacteria coming into the plant with the sewage breed and multiply, the scum forming over the surface of the liquid and coating the undersides of cell tops aids in excluding the deadly air already kept excluded from the anaerobic laboratory section of the plant by reason of the fact that the water level is maintained at a sufficiently higher level than cell tops, so as to doubly assure the exclusion of all air from the cells proper at all times.

The cell space between scum and sludge, being the work shop, same should be deep in proportion to exposed surface area; consequently the dividing of the anaerobic laboratory into cell multiples, dark and deep, with a minimum surface area exposed in the vertical pipes emerging upward from the cells proper.

In the operation of the plant the sewage passes through the soil feed line into the nipple 22 of the inlet fitting 11. The force of the inrushing sewage is broken within the inlet fitting which is of sufficient height to accomplish this purpose so that no appreciable disturbance or agitation can take place in the cell proper. It is important to note that the inlet fitting being centrally located on the closure 9 of the cell 5 evenly distributes the sewage over the surface of the bottom of the first cell 3. The air that may be forced down the pipe line 1 and into the inlet fitting 11 is not forced into the cell but may and does escape through the vent nipple 23 into the pipe 24 and eventually into the aerobic laboratory until the pipe line 1 has been cleared when the travel of air is again reversed and is carried with the draft escaping through vent pipe 2.

As the solid matter injected with the sewage slowly settles down and accumulates on the cell bottoms, a substance resembling moss forms on its surface. This moss is filled with gas bubbles and the buoyant effect of these gas bubbles, exercising a lifting power, causes them in rising to tear loose and carry particles of this moss upward through the liquid. In rising through the liquid these gas bubbles escape, causing the moss to fall again, and while undergoing this process of rising and falling, the solids are gradually reduced to liquids and vapors. Now by reason of the especially designed cone-shaped closures 9 of the various cells, all vapors (gases or otherwise) forming within the cells and rising through the water within said pipes to the water surface are carried directly to the lower open ends of the fittings 11, 14 and 16 that extend upward from the closures 9, the escape taking place within said pipes, a very confined area, thus disturbing while escaping a very limited area of liquid surface. The escaping vapors are carried away through air vents provided.

As sewage enters the first cell 3 an equal amount of liquid passes from the cell 3 through the pipe 7 into the second cell and such liquid carries with it fine particles of sewage in suspension which again gradually settle to the bottom of the second cell wherein the process described in respect of the first cell is practically repeated although the solids in the second cell are in such a much finer state of suspension. Of course, when the liquid passes from the first cell into the second cell liquid is displaced from the second cell into the third cell wherein the digestion of the solids is practically completed. After passing through the filter of the third cell the liquid which results from the treatment of the sewage in the anaerobic laboratory passes into the aerobic laboratory where it is treated with an excess of oxygen so that the liquid is rendered sanitary, harmless and inoffensive. It is to be noted that the vents 2 and 48 both take a part in supplying air to the aerobic laboratory since the air may freely pass above the level of the liquid in the anaerobic laboratory through the pipes and nipples provided therefor.

The apparatus when properly installed completely digests and disposes of the sewage but if, on account of faulty installation or on account of an overloading of an insufficiently sized plant, it becomes necessary to remove surplus sludge from the cells this may be readily done by removing the plugs 21, 27 and 32 to enable ready access to be had to the interior of the cells.

I claim:—

1. In a sewage disposal system, an anaerobic laboratory comprising a plurality of cells connected in series, each cell having a closure for its top and a fitting connected with the closure, means for supplying sewage to the fitting of the first cell, means for conducting away the discharge from the fitting of the last cell, and means for venting the fittings of all the cells whereby the escape of air carried down with the sewage is provided for and the exclusion of air in the cells is provided.

2. In a sewage disposal system, an anaerobic laboratory comprising a plurality of cells, an inlet fitting to the first cell of the series, and including a vertical pipe section having its lower end connected to the upper end of the first cell of the series and having a sewage inlet nipple intermediate its ends, a venting nipple above said sewage inlet nipple, a venting fitting connected to the second cell and to the venting nipple of the first cell, and a discharge fitting connected to the last cell of the series and having a venting nipple connected to the vent fitting of the second cell.

3. In a sewage disposal system, an anaerobic laboratory comprising a plurality of cells, each cell including a plurality of upright sections of vitreous clay sewer pipe stock, each section having a bell end designed to be interfitted with a straight end of the adjacent section, a closure for the upper end of each cell, fittings connected with the closures, means for supplying sewage to the fittings of the first cell, means for conducting away the discharge from the fitting of the last cell, venting means connected with the fittings, and means for connecting the cells in series.

4. In a sewage disposal system, an aerobic laboratory comprising an array of pipes including main pipes and branch pipes, and a vent connected with the main pipes.

5. In a sewage disposal system, an anaerobic laboratory including a plurality of elongated vertical cells, a frusto-conical closure for the upper end of each cell, each closure having an opening in its center, fittings having their lower ends received in the openings of the closure for the lower end of each fitting terminating at a point not below the inner faces of each closure, means for connecting the cells in series, means for supplying sewage to the fitting of the first cell of the series, means for carrying away liquid from the fitting of the last cell, and venting means associated with the fittings.

6. In a sewage disposal system, an anaerobic laboratory including an elongated vertical cell, a closure for the upper end of the cell having its inner face inclined upwardly toward its center, the center of the closure having an opening, and a fitting having its lower end fitted in the opening and terminating at a level not below the highest point on the inner face of the closure.

7. In a sewage disposal system, an anaerobic laboratory including an elongated vertical cell, a closure for the upper end of the cell having its inner face inclined upwardly toward its center, the center of the closure having an opening, said closure including an annular metal supporting plate having a radial slit and its radial edge overlapped and having its outer peripheral edge engaged with the cell whereby the plate takes a frusto-conical form, and a layer of concrete poured on said plate, and a fitting having its lower end fitted in the opening and terminating at a level not below the highest point on the inner face of the closure.

8. In a sewage disposal system, an anaerobic laboratory including a plurality of elongated vertical cells, means for connecting the cells in series, an inlet fitting connected to the first cell of the series, said inlet fitting including a vertical pipe section having an inclined branch intermediate its ends, means for supplying sewage to the branch, means for venting the cells and an outlet leading from the last cell of the series.

9. In a sewage disposal system, a plurality of elongated vertical cells, a closure for the upper end of each cell, a relatively small fitting connected to each closure, means for venting the fittings, means for connecting the cells in series, means for supplying sewage to the fitting of the first cell of the series, and means for carrying away the discharge from the last cell of the series.

RAY MARION BIRNBACH.